(12) United States Patent
Lang

(10) Patent No.: US 11,932,275 B2
(45) Date of Patent: Mar. 19, 2024

(54) METHOD FOR OPERATING AN AUTONOMOUSLY MOVING ROAD USER

(71) Applicant: Audi AG, Ingolstadt (DE)

(72) Inventor: Markus Lang, Sappenfeld (DE)

(73) Assignee: AUDI AG, Ingolstadt (DE)

( * ) Notice: Subject to any disclaimer, the term of this patent is extended or adjusted under 35 U.S.C. 154(b) by 178 days.

(21) Appl. No.: 17/417,330

(22) PCT Filed: Jan. 8, 2020

(86) PCT No.: PCT/EP2020/050289
§ 371 (c)(1),
(2) Date: Jun. 22, 2021

(87) PCT Pub. No.: WO2020/151947
PCT Pub. Date: Jul. 30, 2020

(65) Prior Publication Data
US 2022/0055656 A1 Feb. 24, 2022

(30) Foreign Application Priority Data
Jan. 25, 2019 (DE) .................... 10 2019 200 935.2

(51) Int. Cl.
*B60W 60/00* (2020.01)
*B60W 40/105* (2012.01)

(52) U.S. Cl.
CPC ........ *B60W 60/001* (2020.02); *B60W 40/105* (2013.01); *B60W 2510/0638* (2013.01); *B60W 2554/4041* (2020.02)

(58) Field of Classification Search
CPC ............ B60W 60/001; B60W 40/105; B60W 2554/4041; B60W 2510/0638
See application file for complete search history.

(56) References Cited

U.S. PATENT DOCUMENTS 9,442,489 B2  9/2016 Reichel et al.
10,156,845 B1 * 12/2018 Greenberger .... G08G 1/096725
(Continued)

FOREIGN PATENT DOCUMENTS

CN    103136965 A    6/2013
CN    109196566 A    1/2019
(Continued)

OTHER PUBLICATIONS

International Search Report and Written Opinion of the International Searching Authority directed to related International Patent Application No. PCT/EP2020/050289, dated Apr. 24, 2020, with attached English-language translation; 17 pages.
(Continued)

*Primary Examiner* — Hussein Elchanti
(74) *Attorney, Agent, or Firm* — Sterne, Kessler, Goldstein & Fox P.L.L.C

(57) ABSTRACT

The present disclosure relates to a method for operating an autonomously moving road user, in particular a motor vehicle. A signal relating to an external event is received, and an authorization of the road user is compared with an authorization prescribed due to the external event. Navigation parameters are restricted as a function of the comparison. The present disclosure further relates to an autonomously moving road user.

15 Claims, 2 Drawing Sheets

(56) References Cited

U.S. PATENT DOCUMENTS

| | | | |
|---|---|---|---|
| 10,565,873 B1* | 2/2020 | Christensen | H04W 4/40 |
| 10,768,621 B1* | 9/2020 | Nix | G01C 21/3407 |
| 10,783,780 B2 | 9/2020 | Zydek et al. | |
| 10,807,591 B1* | 10/2020 | Kentley-Klay | G08B 21/10 |
| 10,854,087 B2 | 12/2020 | Schwensfeier | |
| 2002/0143461 A1 | 10/2002 | Burns et al. | |
| 2013/0090806 A1 | 4/2013 | Hahne | |
| 2017/0069001 A1* | 3/2017 | Scofield | G08G 1/0141 |
| 2017/0146350 A1 | 5/2017 | Beaurepaire | |
| 2017/0276492 A1* | 9/2017 | Ramasamy | G08G 1/096758 |
| 2018/0018869 A1* | 1/2018 | Ahmad | G06V 20/63 |
| 2018/0233047 A1* | 8/2018 | Mandeville-Clarke | G08G 1/166 |
| 2018/0335781 A1 | 11/2018 | Chase et al. | |
| 2018/0350238 A1 | 12/2018 | Altinger et al. | |
| 2019/0225145 A1 | 7/2019 | Sippl | |
| 2020/0098253 A1* | 3/2020 | Zeplin | G08G 1/081 |
| 2020/0201353 A1* | 6/2020 | Martin | G01C 21/3415 |

FOREIGN PATENT DOCUMENTS

| | | |
|---|---|---|
| DE | 10033859 A1 | 1/2002 |
| DE | 102011102024 A1 | 4/2012 |
| DE | 102012021282 A1 | 4/2014 |
| DE | 102015219469 A1 | 4/2016 |
| DE | 102016217779 A1 | 3/2018 |
| DE | 102017200695 A1 | 7/2018 |
| WO | WO 2017/148531 A1 | 9/2017 |
| WO | WO 2018/134026 A1 | 7/2018 |

OTHER PUBLICATIONS

International Preliminary Report on Patentability directed to related International Patent Application No. PCT/EP2020/050289, dated Jul. 27, 2021, with attached English-language translation; 14 pages.

\* cited by examiner

METHOD FOR OPERATING AN AUTONOMOUSLY MOVING ROAD USER

TECHNICAL FIELD

The present disclosure relates to a method for operating an autonomously moving road user. In addition, the present disclosure also relates to an autonomously moving road user. The autonomously moving road user is in particular a motor vehicle.

BACKGROUND

Motor vehicles are increasingly being designed to be autonomous. In this case, specific driving functions are automatically controlled by means of assistance systems so that a driver only has to make some driving interventions. Fully autonomous motor vehicles are also known in which a driver is not absolutely necessary. In the case of these autonomous motor vehicles, which in particular comply with a level 5, the desired destinations are entered. Using the assistance systems of the motor vehicle, a suitable route to the destination is selected and, for example, dynamically adjusted if any disturbances occur along the route. The motor vehicle is then moved autonomously along the route by means of autonomous driving maneuvers.

Autonomously moving motor vehicles of this type are intended to be used as driving service providers in large cities or the like. Thus, a plurality of different people are transported with each of the autonomously moving motor vehicles. But, private motor vehicles should also be designed to be autonomous in such a way that the owner can be transported autonomously to specific destinations in his motor vehicle.

Since manual intervention is not absolutely necessary in such autonomously moving motor vehicles, it is possible that the person transported with them is not always present or has even forgotten about the rules of the transport company. If an unexpected event or the like occurs, for example a dangerous situation, a response from the person is usually required, in particular to allow for a safe operation or at least a rule-compliant operation and/or to avoid excessive deterioration in the flow of traffic.

US 2018/0335781 A1 discloses a system for transmitting context-related messages between two motor vehicles.

A method for determining a route is known from US 2017/0146350 A1. In this case, access restrictions are taken into consideration.

BRIEF DESCRIPTION OF DRAWINGS/FIGURES

DETAILED DESCRIPTION

Figure 1:
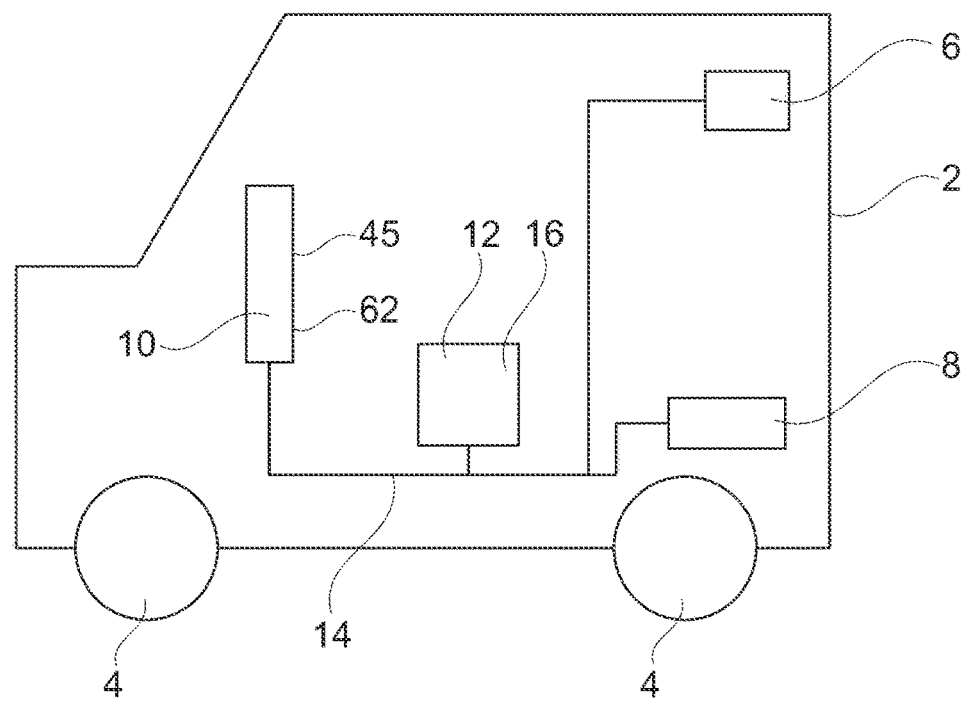
FIG. 1 shows schematically and simplified an autonomously moving motor vehicle in accordance with some embodiments.

The present disclosure is based on the object of specifying a particularly suitable method for operating an autonomously moving road user as well as a particularly suitable autonomously moving road user, wherein security is increased, and a traffic flow is expediently improved.

With regard to the method, this object is achieved according to the features of claim 1 and with regard to the autonomously moving road user by the features of claim 10. Advantageous further developments and refinements are the subject matter of the respective dependent claims.

In some embodiments, the method is used to operate an autonomously moving road user, also referred to below simply as "road users." The autonomously moving road user is, for example, an autonomously moving aircraft, such as a helicopter or a drone. At least it is possible for the autonomously moving aircraft to be spaced apart from the ground, with the autonomously moving aircraft being expediently movable, detached from further components, expediently along three dimensions. In this case, the movement along the dimensions is substantially independent of any mechanical specifications. The autonomously moving aircraft expediently has a rotary wing that is driven. It is thus possible to position the autonomously moving aircraft substantially statically at a specific position. By way of a non-limiting example, the autonomously moving aircraft is, for example, an autonomously moving airplane.

In some embodiments, by way of a non-limiting example, the autonomously moving road user is an autonomously moving motor vehicle. The autonomously moving motor vehicle is land-based and, in particular, can be moved independently of rails or the like. In operation, the autonomously moving motor vehicle is expediently moved along a lane, an arrangement in the lane preferably being freely selectable. The autonomously moving motor vehicle is, for example, a commercial vehicle. By way of a non-limiting example, in some embodiments, the autonomously moving motor vehicle is a passenger vehicle. The autonomously moving motor vehicle has a drive for propulsion that comprises, for example, an internal combustion engine, an electric motor, or a combination thereof.

In some embodiments, the autonomously moving road user is configured to be moved autonomously. By way of a non-limiting example, interventions in a locomotion controller by a user are not necessary in order to move the autonomously moving road user along a specific route, in particular to a destination. A route to the destination is dynamically adjusted in this case or is at least adapted while the autonomously moving road user is moving. The autonomously moving road user comprises suitable assistance systems by means of which an autonomous operation takes place. In particular, interventions in the direction/speed of movement and/or a creation of the route is carried out by means of the assistance systems. The assistance systems are designed, for example, at least partially as pilot systems. The autonomously moving road user expediently complies with an automation level 5 according to the Society of Automotive Engineers (SAE) definition. In summary, the autonomously moving road user is in particular a highly automated or preferably a fully automated road user.

In some embodiments, the autonomously moving road user has a control unit by means of which a method for operating the autonomously moving road user according to embodiments described herein is carried out. The control unit is formed, for example, by means of a microprocessor or comprises, for example, a microprocessor. The control unit is designed to be programmable. By way of a non-limiting example, the control unit is an application specific integrated circuit (ASIC).

In some embodiments, the method provides that a signal relating to an external event is received in a first work step.

The external event is independent of the autonomously moving road user and thus also of any person moving with it, in particular a user or driver. The external event is, for example, a closure of a region of an infrastructure, such as a specific road or an accident, for example. By way of a non-limiting example, the external event is a disaster. The external event has an influence on an infrastructure along which the autonomously moving road user is moved or at least can be moved. By way of a non-limiting example, due to the external event, a disruption of a traffic flow takes place, which includes the autonomously moving road user.

In some embodiments, the signal specifies that an external event has occurred. The signal is preferably a radio signal and is thus received without contact by means of the autonomously moving road user. By way of a non-limiting example, the radio signal is a broadband or multi-band signal. The signal preferably complies with a specific radio standard, for example, a mobile radio standard such as 3G, long-term evolution (LTE), or 5G. In some cases, the signal complies with a wireless local area network (WLAN) standard. The signal is created by means of or from a control center. The control center is operated by an authority or at least a sovereign body, so that specific instructions can be sent to the autonomously moving road user by means of it.

In some embodiments, an authorization of the road user is compared with an authorization prescribed due to the event. The prescribed authorization is, for example, adjusted to the external event or a specific class of external events to which the external event belongs and thus differs between different external events or different classes of external events. By way of a non-limiting example, the prescribed authorization is transmitted with the signal. The prescribed authorization is determined on the basis of the external event transmitted by means of the signal or at least a classification of the external event. A database is stored in the autonomously moving road user.

In some embodiments, the navigation parameters of the autonomously moving road user are restricted as a function of the comparison. The navigation parameters include a possible direction of movement and/or movement routes of the autonomously moving road user. By way of a non-limiting example, the plurality of possible directions of movement of the autonomously moving road user is described by means of the navigation parameters. The navigation parameters also include all possible speeds of movement, i.e., a backward movement, a standstill or a forward movement, as well as the amount of the respective speed. In summary, a description of all trajectories along which the autonomously moving road user can be moved is carried out by means of the navigation parameters.

In some embodiments, the navigation parameters are restricted here so that at least some directions of movement and/or speeds of movement are not available. The autonomously moving road user is then moved autonomously using the restricted navigation parameters. Accordingly, when the external event has occurred and the signal is therefore present, the autonomously moving road user is restricted in his freedom of movement.

In some embodiments, by way of a non-limiting example, due to the restriction of the navigation parameters, it is possible to create free spaces or gaps in the flow of traffic so that, for example, emergency vehicles or the like can pass substantially without hindrance and, can reach the external event. Thus, security is increased. In this case, no hindrance of the emergency services or the like takes place by the autonomously moving road user, so that they are moved in accordance with the rules. Due to the restrictive navigation parameters, a traffic flow can also be maintained in this case, which is why the formation of traffic jams or the like is avoided in particular.

In some embodiments, the movement by means of the restricted navigation parameters is carried out by means of suitable assistance systems that make appropriate interventions in the control of the autonomously moving road user. By way of a non-limiting example, the speed of movement and/or direction of movement of the autonomously moving road user is changed, so that the user complies with the restricted navigation parameters. If, for example, the autonomously moving road user is moved at a speed that is no longer available due to the restriction, the autonomously moving road user is accelerated or decelerated to a speed that is still available with the restricted navigation parameters.

For example, the road user has a plurality of different authorization levels, i.e., a discrete number of different authorizations. Processing is thus simplified. In particular, the road user has at least three different authorization levels, substantially no restriction of the navigation parameters taking place at one of the authorization levels, the navigation parameters being relatively severely restricted at one of the authorization levels, and the navigation parameters being partially restricted at a further authorization level.

In some embodiments, a maximum speed is limited as a restriction of the navigation parameters. Due to the limitation of the maximum speed, the autonomously moving motor vehicle can only be moved at a maximum at the prescribed maximum speed. Thus, with two successive autonomously moving road users, for example, a spatial distance is constant, but a time gap between the two successive road users is increased. It is thus possible, for example, to allow an emergency vehicle or the like to pass transversely to them in the case of an intersection. Due to the limitation of the maximum speed for passers-by, a risk is reduced, and a subsequent accident is also avoided. For example, the maximum speed is 30 km/h, 15 km/h, or 10 km/h.

In some embodiments, by way of a non-limiting example, a right of way is canceled as a restriction of the navigation parameters. The autonomously moving road user is moved in such a way to never take advantage of his right of way. If an emergency vehicle or the like approaches the autonomously moving road user, the behavior of the autonomously moving road user takes place in a coordinated manner to the emergency vehicle, and the emergency vehicle is either given priority or the autonomously moving road user is moved out of the route of the emergency vehicle. Thus, the emergency vehicle or at least a vehicle that is given the right of way reaches the destination comparatively quickly, which increases safety. By way of a non-limiting example, in some embodiments, an overtaking operation is granted as a restriction so that any further road user moving in the same direction of movement can overtake the autonomously moving road user substantially without hindrance.

In some embodiments, in the case of the restriction of the navigation parameters, passage through a specific area is prohibited. In this case, the external event is located within the specific area, in particular in the region of the center point thereof. It is therefore not possible to drive into the specific area, in particular if the autonomously moving road user is configured as a motor vehicle. If the autonomously moving road user is, for example, an aircraft, penetration into the specific flight space is not possible when there is an overflight ban. Due to the restriction, it is not possible to use a specific infrastructure, which is therefore blocked for the autonomously moving road user. For example, a map of a navigation system or the navigation system itself is adjusted. A new route is thus created and/or selected by means of the navigation system, if any, due to the change in the map stored therein. Thus, the autonomously moving road user is not guided into the specific area by means of the navigation system due to the restrictions of the navigation parameters. Thus, only a comparatively small adjustment of an already existing autonomously moving road user is required, which reduces manufacturing costs. Also, due to the prohibition of the passage through the specific area, an excessive flow of traffic in the region of the external event is avoided, which is why any emergency services is possible without any hindrance. Furthermore, an overload of a traffic flow located in the specific area is reduced in this way.

In some embodiments, in the case of the restriction of the navigation parameters, a rule set or the like is canceled. By way of a non-limiting example, it is possible to stop in a no-stopping region and/or drive on a one-way street against its usual direction of travel. Due to the restriction of the navigation parameters, it is possible to drive on a one-way street in the opposite direction of travel.

In some embodiments, a single navigation parameter is expediently prescribed as a restriction. The navigation parameter is expediently a single trajectory along which the autonomously moving road user is then moved. In this case, the autonomously moving road user is, for example, stopped substantially immediately or navigated to a specific point and stopped there, for example parked. The point is, for example, a parking lot or a possible hard shoulder. In some cases, the only navigation parameter is, for example, that the road user turns around, so that they are then moved against the original direction of travel. In some cases, the restriction takes place in such a way that the autonomously moving road user is moved along a specific route, for example, on the widest possible right or left edge of a roadway or the like. In some cases, the autonomously moving road user is substantially immediately brought to a standstill, the road user being in particular initially moved to an edge of the roadway, and/or movement of the autonomously moving road user takes place around the specific area or at least the external event, in particular, due to the restriction of the navigation parameters.

In some embodiments, the navigation parameters are restricted as a function of the authorization of the road user when the signal relating to the external event is received. The restriction takes place as a function of further parameters and/or comparisons. A restriction of the navigation parameters takes place as a function of a comparison of an environment of the road user with an environment prescribed due to the event. Thus, when the signal is received, the road user's environment is first specified. In addition, the prescribed environment is determined due to the external event. This is transmitted, for example, or carried out by the autonomously moving road user himself due to a comparison of a database.

In some embodiments, the prescribed environment is dependent on the external event and is prescribed by means of a circle around the external event, which has a radius of 500 m, 1000 m, 2 km, or 5 km, for example. In some cases, the outer contour of the prescribed environment is adjusted to a current infrastructure. The external event is located substantially in the center of the prescribed environment. For example, the prescribed environment corresponds to the specific area, if any. The prescribed environment is larger in terms of area or volume than any specific area, and the prescribed environment comprises the particular area in each case.

In some embodiments, the environment of the road user is self-limited, for example, or extends by only a comparatively small distance away therefrom, for example, 10 m, 5 m, or 1 m. By way of a non-limiting example, the environment around the road user extends a maximum of 1 km, the road user being located substantially at the center point of the environment around the road user.

In some embodiments, if the two environments overlap, the road user is affected by the external event. If there is a comparatively large distance between them, and thus there is no overlap, or at least a distance is greater than a specific limit value, there is no effect on the road user and his driving style and/or navigation parameters, such as the route selection. In this case, suitably no restriction of the navigation parameters takes place. However, if the two environments overlap, the restriction takes place. It is thus possible to move the road user substantially without hindrance when the distance to the external event is comparatively great, whereas if the external event has an influence on the road user, the navigation parameters thereof are restricted. Thus, a traffic flow is further improved.

In some embodiments, the restriction of the navigation parameters takes place as a function of the comparison of a direction of movement of the road user with a position of the external event. By way of a non-limiting example, the position of the external event is first determined, which is transmitted in particular by means of the signal, and/or the direction of movement of the road user is specified. If the direction of movement points away from the position of the external event, no restriction of the navigation parameters takes place. It is thus possible to move the road user away from the external event and, from the prescribed environment of the external event. Since no restriction of the navigation parameters takes place in this case, the road user is removed comparatively quickly from the prescribed environment, so that the flow of traffic there is not impeded.

In some embodiments, if the direction of movement is in the direction of the position of the external event or, for example, only deviates from it by a comparatively small angular amount, for example, 90°, 45°, or 20°, if the road user moves without hindrance, they would be moved closer to the external event. In this case, restriction of the navigation parameters takes place so that either the speed of the approach is slowed down or the road user preferably does not reach the external event at all.

In some embodiments, by way of a non-limiting example, the authorization of the road user is prescribed so as to be fixed and is expediently linked to a hardware of the road user, for example, a body. The authorization is adjusted to a possible use of the road user. If the road user is, for example, an emergency vehicle, a sovereign vehicle, or the like, the possible authorization level is expediently comparatively high, so that no or only a slight restriction of the navigation parameters takes place. If a purpose of this type does not exist, the authorization level is preferably comparatively low, so that a comparatively strong restriction of the navigation parameters takes place. If, for example, the road user is assigned to transport people with special requirements or a special status, for example, diplomats or politicians, an authorization status in particular is also comparatively high, for example, just as high as that of an emergency vehicle or only comparatively close thereto. In some cases, a comparatively small restriction of the navigation parameters takes place, so that this group of people is also moved substantially without hindrance by means of the road user.

In some embodiments, the method includes detecting user input. By way of a non-limiting example, there is the option of entering the user input. This takes place, for example, by means of a touchpad or the like. As a function of the user input, the restriction of the navigation parameters is at least partially or completely lifted. In particular, a restriction on a maximum speed and/or a specific route selection is lifted in this case. If, for example, an authorized person is moved by means of a road user who intrinsically does not have a comparatively high authorization level, it is thus possible to increase the authorization for this road user by means of the user input or at least to lift the restriction. The restriction is only lifted temporarily and is ended when the road user starts again or at least when the authorized person exits.

In some embodiments, as a function of the user input, the authorization is increased or at least the restriction of the navigation parameters is at least partially lifted. This means that volunteers, such as a member of the voluntary fire brigade, a member of the technical relief organization, or a police officer who is currently not on duty, can reach the external event and, if necessary, help there.

In some embodiments, a message is output if a restriction of the navigation parameters takes place. The user is thus informed that a response to the external event by the autonomously moving road user takes place. As a result, the user can adjust to a possible change in the route or a specific response type of reaction by the autonomously moving road user. This is therefore not a surprise, which increases comfort. By way of a non-limiting example, a notification is output if no restriction of the navigation parameters takes place. The output is carried out acoustically and/or optically, for example, by means of a suitable display. The user of the road user is thus informed that the navigation parameters are restricted or not. If, for example, no restriction of the navigation parameters takes place, it is clear to the user that the external event does not affect them. If, for example, the user was informed about the external event due to other media, for example by means of a radio or a news service, and if the user is, for example, located in the environment of the external event, he will not feel confused if no restriction takes place. This increases confidence in the functioning of the autonomously moving road user.

In some embodiments, the autonomously moving road user has a drive that comprises, for example, an internal combustion engine, an electric motor, or a combination thereof. By way of a non-limiting example, the drive has a drive control by means of which a power of the drive is set. The drive is part of a drive train.

In some embodiments, the autonomously moving road user comprises a controller, which is provided and configured to carry out a method in which a signal relating to an external event is received and an authorization of the road user is compared with an authorization prescribed due to the event. Navigation parameters are restricted as a function of the comparison.

In some embodiments, the autonomous motor vehicle includes an assistance system that is provided and configured to operate the autonomously moving road user according to various embodiments of the method described herein. The assistance system has an interface for a drive control and/or a steering system, so that instructions can be applied to the drive control or the steering system by means of the assistance system. The assistance system has a camera, a transmitter, and/or a receiver. By way of a non-limiting example, the assistance system comprises an interface so that any notification/warning can be output optically and/or acoustically. For example, one of the interfaces mentioned above is provided by means of an interface for a bus system. Hardware requirements are thus reduced.

In some embodiments, the autonomously moving road user is a motor vehicle, which is moving autonomously and has a number of wheels. By means of the wheels, in particular contact with an environment, a floor such as a lane takes place. By way of a non-limiting example, the autonomously moving motor vehicle is land-based and, can be moved independently of rails or the like. For example, the autonomously moving motor vehicle is a passenger car (car) or a commercial vehicle, such as a truck or a bus. The autonomously moving motor vehicle is a highly automated motor vehicle. An automation level of the autonomous motor vehicle is equal to 5 according to the SAE definition. In some cases, the autonomously moving road user is an autonomously moving aircraft.

The advantages and developments described in connection with the method embodiments are analogously also applicable to the motor vehicle embodiments and vice versa.

FIG. 1 shows schematically and simplified an autonomously moving motor vehicle in accordance with some embodiments. An autonomously moving road user 2 is shown in the form of an autonomously moving motor vehicle. The motor vehicle 2 has a number of wheels 4 by means of which contact is made with a road (not shown in detail) in the intended state. In addition, the motor vehicle 2 has a drive (not shown), which comprises an internal combustion engine, an electric motor, or a combination thereof. At least some of the wheels 4 are driven by means of the drive. The control of the drive takes place by means of an assistance system (not shown), by means of which setting of a direction of movement also takes place. By way of a non-limiting example, a steering device of the motor vehicle 2 is actuated by means of the assistance system. The assistance system is thus a pilot system and it is possible to move the motor vehicle 2 completely autonomously. Accordingly, intervention by a driver is not required.

The motor vehicle 2 has a position sensor 6, which is designed, for example, as a GPS receiver. By means of the position sensor 6, it is possible to determine the position of the autonomously moving road user 2. The motor vehicle 2 also has a receiver 8, by means of which radio signals can be received. The receiver 8 works according to a mobile radio standard, such as 3G, LTE, or 5G, and is upgraded to receive encrypted messages from a control center 9 shown in FIG. 3. The control center 9 is operated by an authority that performs sovereign tasks.

In accordance with some embodiments, the motor vehicle 2 comprises a combined input/output device 10 in the form of a touchpad, which comprises a touch-sensitive display. In addition, the autonomously moving motor vehicle 2 has a controller 12. The controller 12, the input/output device 10, the receiver 8, and the position sensor 6 are connected to one another for signaling purposes by means of a bus system 14, which is, for example, a controller area network (CAN) bus system or a Flexray bus system. In addition, the assistance system, by means of which the control of the drive and the steering takes place, is connected to the bus system 14 for signaling purposes. Navigation parameters 16 are stored in the controller 12, such as all possible travel speeds by means of which the motor vehicle 2 can be moved. Any possible routes that can be selected by means of the motor vehicle 2 are also stored therein. The navigation parameters 16 are made available to the assistance system during operation via the bus system 14.

Figure 2:
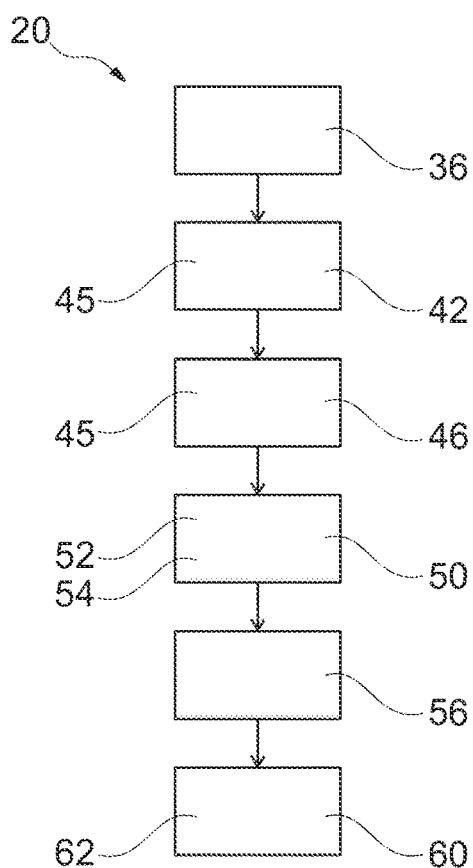
FIG. 2 shows a method for operating the autonomously moving motor vehicle in accordance with some embodiments.
Figure 3:
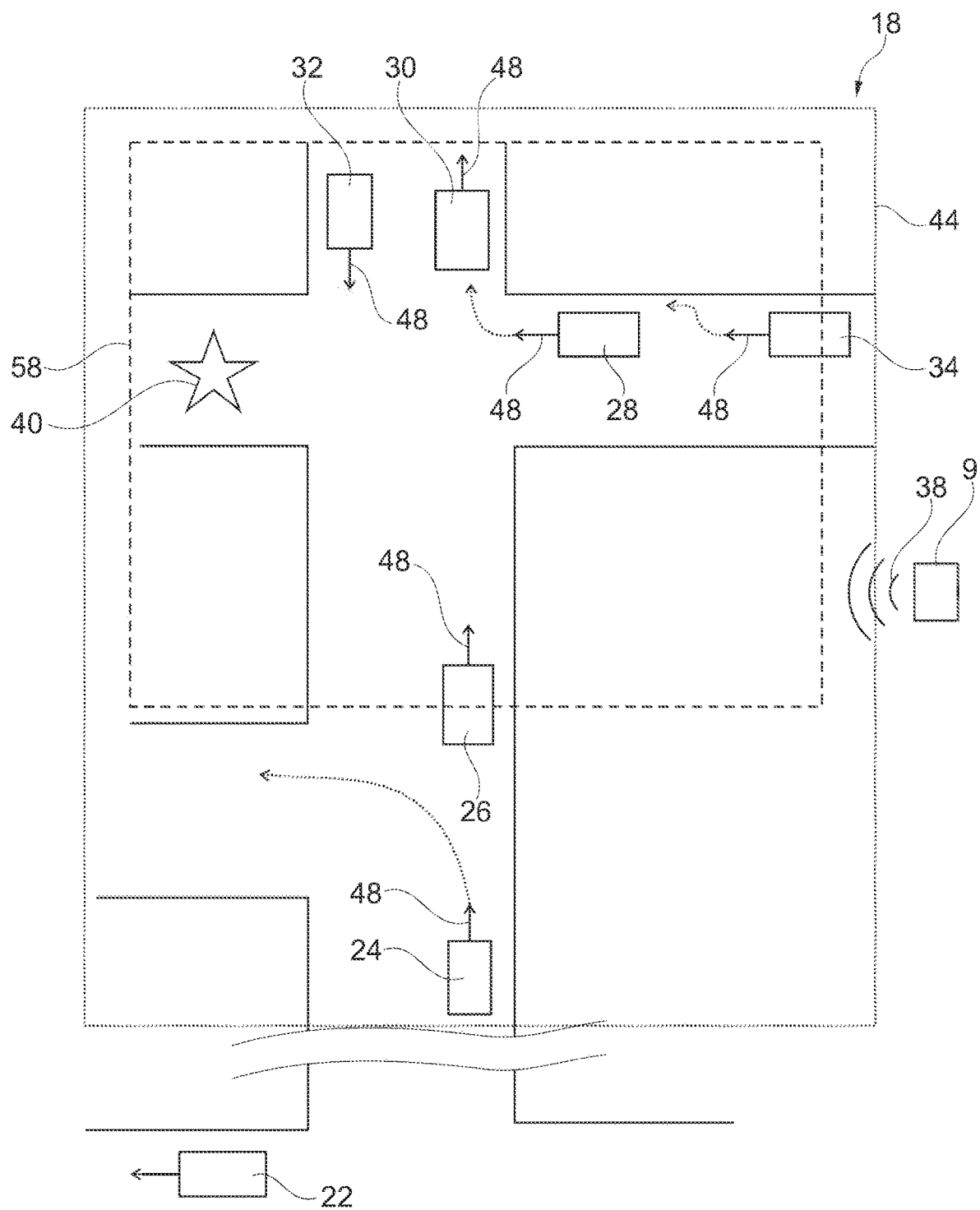
FIG. 3 shows a number of autonomously moving motor vehicles in a specific area in accordance with some embodiments.

FIG. 2 shows a method for operating the autonomously moving motor vehicle in accordance with some embodiments. If the motor vehicle 2 is located in a driving situation 18 shown in FIG. 3, a method 20 shown in FIG. 2 is carried out at least partially by means of the controller 12. FIG. 3 shows a number of autonomously moving motor vehicles in a specific area in accordance with some embodiments. In FIG. 3, there are a plurality of such motor vehicles 2, namely a first road user 22, a second road user 24, a third road user 26, a fourth road user 28, a fifth road user 30, a sixth road user 32, and a seventh road user 34. In this case, all road users 22, 24, 26, 28, 30, 32, 34 are constructed and designed in accordance with the autonomously moving road user 2 shown in FIG. 1. Private persons are transported by means of the first road user 22, the second road user 24, the fourth road user 28, and the fifth road user 30. The seventh road user 34 is a private motor vehicle, by means of which a police officer, who is not on duty or a member of a voluntary aid organization, such as a volunteer fire brigade or a technical aid organization, is transported. The third road user 26 is an emergency vehicle, such as a fire engine or a police vehicle. The sixth road user 32 is a diplomatic vehicle, by means of which a diplomat is thus transported. By way of a non-limiting example, the sixth road user 32 is a politician's vehicle, which is thus assigned to a specific politician or a specific group of politicians.

In a method step 36, the road users 22, 24, 26, 28, 30, 32, and 34 receive a signal 38 by means of the receiver 8. The signal 38 is a coded radio signal and relates to an external event 40 that is independent of all road users 22, 24, 26, 28, 30, 32, and 34. The external event 40 is, for example, an accident due to which a specific road is closed.

In a method step 42, a verification of an environment of the respective road users 22, 24, 26, 28, 30, 32, 34 takes place with an environment 44 prescribed due to the external event 40. The prescribed environment 44 is prescribed due to the external event 40, which is substantially located in the center of the prescribed environment 44, and the boundary of which runs, for example, between 3 km and 5 km, the limit expediently being adjusted to the prevailing infrastructure. The environment of the road users 22, 24, 26, 28, 30, 32, 34 extends from these 2 m in each case to the outside. The respective environments are compared with one another and it is checked whether they at least partially overlap. The first road user 22 is located completely outside the prescribed environment 44, whereas the remaining road users 24, 26, 28, 30, 32, 34 are located within the prescribed environment 44. The first road user 22 is thus comparatively far away from the external event 40, so that the event has substantially no influence thereon, at least not at the current time. As a result, a notification 45 is output in the case of the first road user 22 by means of the input/output device 10, so that the user of the first road user 22, i.e., the person transported therewith, is informed that although the external event 40 is present, this does not relate to the first road user 22. The method 20 is then ended for the first road user 22.

In method step 46 is carried out for the remaining road users 24, 26, 28, 30, 32, 34. In this step, it is checked which direction of movement 48 the remaining road users 24, 26, 28, 30, 32, 34 have, i.e., in which direction they are moving. This is compared with a position of the external event 40. In the case of the fifth road user 30, the direction of movement 48 is directed away from the external event 40, so that the latter is spaced apart from the external event 40 if the vehicle continues uninterrupted. Thus, the external event 40 at least currently has no influence on the fifth road user 30. In the case of the fifth road user 30, the notification 45 is also output by means of the input/output device 10, so that the user of the fifth road user 30 is informed that the external event 40 is present in the vicinity, but that this substantially has no influence thereon. The method 20 is then also ended for the fifth road user 30.

The other road users 24, 26, 28, 32, 34, on the other hand, move in the direction of the external event 40, so that they would approach it if the journey continued uninterrupted. A fourth work step 50 is therefore carried out thereon. In the fourth work step 50, an authorization 52 of the remaining road users 24, 26, 28, 32, 34 is checked. The second road user 24 and the fourth road user 28 transport private persons. These have a comparatively low authorization level. In this case, the authorization level is lower than an authorization 54 which is prescribed due to the external event 40 and which was transmitted by means of the signal 38. The seventh road user 34 also has the same authorization level, since the seventh road user 34 can be used by private individuals, with no verification being made for the respective user.

The third road user 26, on the other hand, is an emergency vehicle that has a comparatively high authorization level. The third road user 26 is moved to the external event 40 so that the people transported therewith can help. In the case of the third road user 26, the notification 45 is, therefore, also output and the method 20 is ended, so that the third road user 26 can reach the external event 40 without hindrance. The sixth road user 32 has a medium authorization level, since a specific group of people is transported by means of this authorization level, which group performs, for example, sovereign tasks or has at least been granted special rights. However, this group of people does not help with the external event 40.

In a method step 56, the navigation parameters 16 of the remaining road users 24, 28, 32, 34 are restricted, i.e., as a function of the comparison of the authorization 52 of the respective road user 24, 28, 32, 34 with the authorization 54 prescribed due to the external event 40. For the other road users 22, 26, 30, on the other hand, no restriction of this type took place due to the termination of method 20, and the notification 45 was output.

The second road user 24 is located outside a specific area 58, whereas the fourth road user 28, the sixth road user 32, and the seventh road user 34 are located at least partially within the specific area 58. The specific area 58 is an environment closer to the external event 40 and the boundary of the specific area 58 is, for example, at a distance of between 200 m and 500 m from the external event 40. As a restriction of the navigation parameters 16, passage of the second road user 24 through the specific area 58 is prohibited. In this case, the specific area 58 is blocked in a navigation system of the second road user 24, which is why an alternative route is determined by means of the navigation system so that the specific area 58 is not traveled.

In the case of the sixth road user 32, as a restriction of the navigation parameters 16, driving on the road blocked due to the external event 40 is prohibited. A maximum speed by means of which the sixth road user 32 can be moved past the external event 40 is also limited, the limitation being comparatively low. However, no other restriction takes place. It is thus possible to move the sixth road user 32 substantially without hindrance in the specific area 58, which is why the group of people which is allowed to use the sixth road user 32 can move substantially without hindrance.

In the case of the fourth road user 28, as a restriction of the navigation parameters 16, at least one right of way is canceled so that the third road user 26 can drive through an intersection passed by the two road users 26, 28 without hindrance. In this example, too, a route for the fourth road user 28 is prescribed so that the latter leaves the specific area 58 as quickly as possible. In addition, a maximum speed is also limited. The seventh road user 34 is located comparatively far away from the external event 40, but already within the specific area 58. In some cases, a specific route is prescribed, namely driving to a hard shoulder and stopping there. By way of a non-limiting example, a single navigation parameter 16 is prescribed as a restriction, namely a single route from which it is not possible to deviate.

After a restriction of the navigation parameters 16, each of the road users 24, 28, 32, 34 is moved autonomously in accordance therewith, for which the drive and the steering are suitably controlled by means of the corresponding assistance system. The road users 24, 28, 32, 34 are thus moved in accordance with the adjusted navigation parameters 16.

In some embodiments, the method 20 provides that a method step 60, a user input 62 is detected, which can be carried out by means of the input/output device 10 by the user of the road user 24, 28, 32, 34 for which the navigation parameters 16 were restricted. The user input 62 is, in particular, a pin code that is only known to authorized persons, such as, the person transported by means of the seventh road user 34, i.e., either a police officer or a specific volunteer. If the user input 62 is correct, i.e. corresponds to a specific pattern or has been verified by the control center 9, the restriction of the navigation parameters 16 is at least partially lifted. If the person transported by means of the seventh road user 34 would like or can help with the external event 40, for example, in particular no restriction of the navigation parameters 16 takes place at all. In contrast, if a politician or a diplomat is transported therewith, for example, a restriction corresponding to the sixth road user 32 is carried out. The group of people to which such a user input 62 is assigned comprises an emergency doctor, special protection, an authority, a politician and/or an ambassador, and is expediently formed by means of these.

In some embodiments, during restriction of the navigation parameters 16, an activation of the deployment log takes place for example, by the potential user, due to the user input 62. As a restriction of the navigation parameters 16, for example, priority is always granted or a specific area 58 or further areas are bypassed. For example, turning, stopping to the left, stopping to the right, a left-hand drive command and/or a right-hand drive command is also granted as a restriction of the navigation parameters 16. For example, the specific area 58 is completely blocked and/or the maximum speed is prescribed as a restriction. It is also possible, for example, to move as a wrong-way driver against a one-way street or to stop in a no-stopping zone. As a restriction of the navigation parameters 16, the right of way is always granted or an overtaking operation is granted so that other road users who have a comparatively high correction level can be moved substantially without hindrance.

The present disclosure is not limited to the embodiment described above. Rather, other variants of the embodiments can also be derived from these by a person skilled in the art without departing from the subject matter of the present disclosure. In particular, all of the individual features described in connection with the embodiment can also be combined with one another in other ways without departing from the subject matter of the present disclosure.

LIST OF REFERENCE SIGNS

2 Autonomously moving road users
4 Wheel
6 Position sensor
8 Receiver
9 Control center
10 Input/output device
12 Controller
14 Bus system
16 Navigation parameter
18 Driving situation
20 Method
22 First road user
24 Second road user
26 Third road user
28 Fourth road user
30 Fifth road user
32 Sixth road user
34 Seventh road user
36 First working step
38 Signal
40 External event
42 Second working step
44 Prescribed environment
45 Notification
46 Third working step
48 Direction of movement
50 Fourth working step
52 Authorization
54 Prescribed authorization
56 Fifth working step
58 Specific area
60 Sixth working step
62 Use input

The invention claimed is:

1. A method for operating an autonomously moving road user, the method comprising:
receiving, by a controller of the autonomously moving road user, a signal and a prescribed authorization related to an external event,
wherein the controller interfaces with an assistance system configured to interface with and apply instructions to a drive control of the autonomously moving road user;
comparing an authorization of the road user with the preconfigured authorization corresponding to the external event to:
provide a restriction of a navigation parameter of a plurality of navigation parameters of the autonomously moving road user; and
prompt an authorized user riding the autonomously moving road user to provide a user input to over-ride the restriction of the navigation parameter;
detecting the user input;
partially or completely lifting the restriction based on the detected user input;
updating the navigation parameter of the plurality of navigation parameters of the road user based on the detected user input, or the authorization of the road user if the user input is not detected; and
making the updated navigation parameters available to the assistance system.

2. The method of claim 1, wherein the road user is a motor vehicle.

3. The method of claim 2, wherein the motor vehicle is an autonomously moving motor vehicle.

4. The method of claim 1, wherein the plurality of navigation parameters comprise a maximum speed of the moving road user, and wherein the method further comprises limiting the maximum speed of the road user to a predetermined threshold.

5. The method of claim 1, wherein the plurality of navigation parameters further comprise a right of way of the road user, and wherein the method further comprises canceling the right of way of the road user.

6. The method of claim 1, wherein the plurality of navigation parameters further comprise passage of the road user through a specific area, and the method further comprises prohibiting the passage of the road user through the specific area.

7. The method of claim 1, further comprising comparing an environment of the road user with an environment corresponding to the external event for updating the navigation parameter of the plurality of navigation parameters.

8. The method of claim 1, further comprising comparing a direction of movement of the road user corresponding to a position of the external event for updating the navigation parameter of the plurality of navigation parameters.

9. The method of claim 1, wherein the updating the navigation parameter of the plurality of navigation parameters of the road user further comprises updating the navigation parameter based on a user input.

10. The method of claim 9, wherein the updating the navigation parameter of the plurality of navigation parameters of the road user further comprises removing a restriction set for the navigation parameter of the plurality of navigation parameters.

11. The method of claim 10, wherein the restriction set for the navigation parameter of the plurality of navigation parameters is partially removed.

12. The method of claim 1, further comprising displaying a notification of the updating of the navigation parameter of the plurality of navigation parameters.

13. A road user, comprising:
an assistance system;
a sensor;
an input device;
an output device; and
a controller, wherein the controller, the sensor, the input device, the output device and the assistance system are connected with each other via a bus system, and
wherein the controller interfaces with an assistance system configured to interface with and apply instructions to a drive control of the road user, and
wherein the controller is configured to:
  receive a signal and a prescribed authorization related to an external event,
  compare an authorization of the road user with the preconfigured authorization corresponding to the external event to:
    provide a restriction of a navigation parameter of a plurality of navigation parameters of the autonomously moving road user; and
    prompt an authorized user riding the autonomously moving road user to provide a user input to over-ride the restriction of the navigation parameter;
  detect the user input;
  partially or completely lift the restriction based on the detected user input;
  the navigation parameter of the plurality of navigation parameters of the road user based on the detected user input, or the authorization of the road user if the user input is not detected; and
  make the updated navigation parameters available to the assistance system.

14. The road user of claim 13, wherein the road user is a motor vehicle.

15. The road user of claim 14, wherein the motor vehicle is an autonomously moving motor vehicle.

* * * * *